United States Patent [19]

Stevens, Jr.

[11] Patent Number: 5,184,573
[45] Date of Patent: Feb. 9, 1993

[54] ANIMAL COLLAR

[76] Inventor: John L. Stevens, Jr., 115 N. State St., Dover, Del. 19901

[21] Appl. No.: 838,847

[22] Filed: Feb. 21, 1992

[51] Int. Cl.$^5$ .............................................. A01K 27/00
[52] U.S. Cl. ...................................... 119/106; 119/156
[58] Field of Search .................. 119/96, 106, 109, 156

[56] References Cited

U.S. PATENT DOCUMENTS

| 2,205,711 | 6/1940 | Banks | 119/106 |
| 2,401,253 | 5/1946 | Lamb, Jr. | 119/106 |
| 3,811,413 | 5/1974 | Scherpenborg | 119/106 |
| 3,814,061 | 6/1974 | Aries et al. | 119/106 |
| 3,978,820 | 9/1976 | Drehman | 119/106 |
| 4,141,322 | 2/1979 | Evans et al. | 119/106 |
| 4,218,991 | 8/1980 | Cole | 119/106 |
| 4,930,451 | 6/1990 | Miller et al. | 119/106 |
| 4,967,698 | 11/1990 | Kennedy | 119/106 |

FOREIGN PATENT DOCUMENTS

| 205213 | 5/1956 | Australia | 119/106 |
| 286728 | 10/1988 | European Pat. Off. | 119/106 |
| 2529054 | 12/1983 | France | 119/106 |
| 2645402 | 10/1990 | France | 119/106 |

*Primary Examiner*—Gene Mancene
*Assistant Examiner*—Thomas Price
*Attorney, Agent, or Firm*—Lane, Aitken & McCann

[57] ABSTRACT

An animal collar includes an elongate tubular member of open mesh material having devices at its ends for securing the collar around the neck of an animal, and a pesticide member positioned within the elongate hollow member. At least one of the openings of the mesh material is enlargeable from a relaxed condition in which the pesticide member is too small to pass to an enlarged condition in which the pesticide member can be inserted or removed.

15 Claims, 2 Drawing Sheets

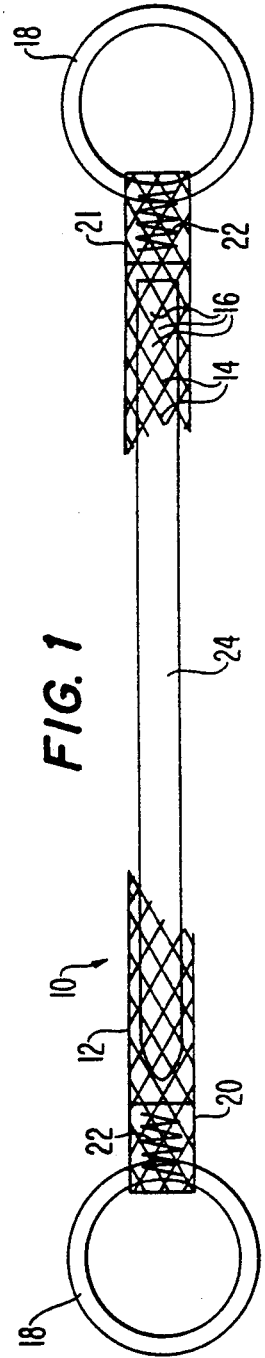
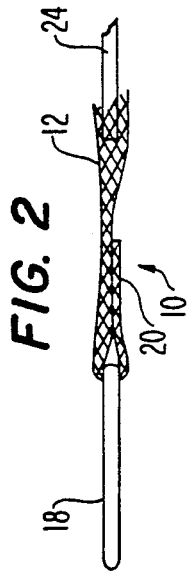
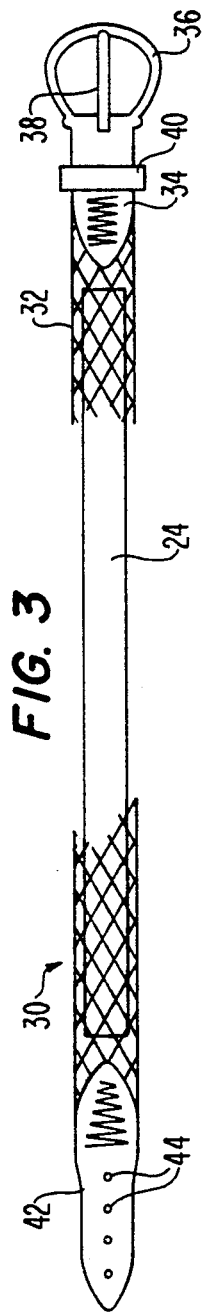
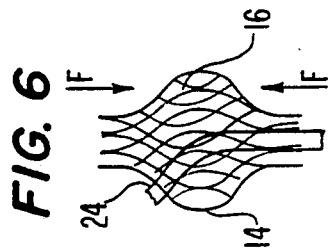

ANIMAL COLLAR

The present invention relates to animal collars, and more particularly, to a collar for both controlling an animal and protecting the animal against pests.

It is common practice to secure a collar of substantial strength around an animal, especially a dog, so that the animal can be controlled by attaching a leash to the collar. It is also common to secure a flea collar, that is, a strip of material permeated with an insecticide to ward off fleas and other pests, around the neck of a pet. Commercially available flea collars have their own devices, such as a buckle, for securing the flea collar around the neck of the animal. However, such flea collars in themselves do not have the strength or durability for controlling the movement of the animal. As a result, dog owners commonly secure control collars and separate flea collars around the necks of their pets.

There have been some efforts to incorporate the flea collar as a part of the control collar. For example, U.S. Pat. No. 2,205,711 to Banks discloses a belt-type animal collar having inner and outer plies, a pad impregnated with insecticide disposed between the plies, and openings in the plies to allow fumes to escape from the pad. There are other known pesticidal collars, such as U.S. Pat. No. 4,218,991 to Cole which discloses a pet collar of conventional construction provided with a buckle and an insecticide strip attached to the inner side of the collar by resilient flanges. U.S. Pat. No. 4,141,322 to Evans et al. discloses an animal collar comprising a leather strap having on its outer surface a series of loops through which a flea collar is intended to be inserted. U.S. Pat. No. 3,814,061 to Aries et al. discloses a pet collar consisting of a flexible tubular element having a plurality of gaps or openings and a solid carrier element in the tubular element for carrying and diffusing active vapors of insecticidal action. U.S. Pat. No. 4,930,451 to Miller et al. discloses an animal collar having a porous sheath of nylon, polypropylene or polyethylene comprising an open mesh for containing a reservoir filled with an animal-treating composition.

SUMMARY OF THE PRESENT INVENTION

In accordance with the present invention, an animal collar having ample strength to control an animal has a large plurality of diamond-shaped openings defining a substantial open area through which the chemicals of a flea strip or other pesticidal strip can act. The openings are defined in an elongate tubular member in which the flea strip is contained, and the openings are smaller than the ends of the flea strip, so as to prevent the flea strip from coming out of the collar. As an example, the tubular member is defined by criss-crossing filaments of a net-like open mesh material having at its ends attachments for securing the collar around the neck of an animal. The flea strip, which can be a commercially-available flea collar having its buckle snipped off, can be inserted into the tubular member through one of the openings defined by the criss-crossing filaments by spreading apart the filaments defining one of the openings near the end of the control collar and slipping the flea strip through the enlarged opening. When the flea strip is entirely within the tubular member, the filaments are released. The filaments return to their unspread condition, either by the elastic nature of the filaments or by the extending of the tubular member around the neck of an animal, or both, whereby the opening through which the flea strip was inserted becomes smaller than the end of the flea strip and, thereby, retains the flea strip. In one embodiment, the animal collar according to the present invention has rings attached to the end of the tubular element to comprise a choke-type collar. In another embodiment, a buckle and apertured strip are attached at opposite ends of the tubular element to define a belt-type collar.

BRIEF DESCRIPTION OF THE DRAWING

FIG. 1 is a schematic plan view, with a central portion of the tubular element removed, of a choke-type animal collar according to the present invention;

FIG. 2 is a front schematic view of a fragment of the collar of FIG. 1;

FIG. 3 is a schematic plan view, with a central portion of the tubular element removed, of a belt-type collar according to the present invention;

FIG. 4 is a schematic view of a section of the tubular element of the animal collar according to the present invention in a relaxed condition;

FIG. 5 is a schematic view of the section of the tubular element of FIG. 4 under tension;

FIG. 6 is a schematic view of a portion of the tubular element of the animal collar according to the present invention during insertion of a flea strip, with some of the openings of the tubular element enlarged.

DETAILED DESCRIPTION OF THE PREFERRED EMBODIMENTS

Figure 7:
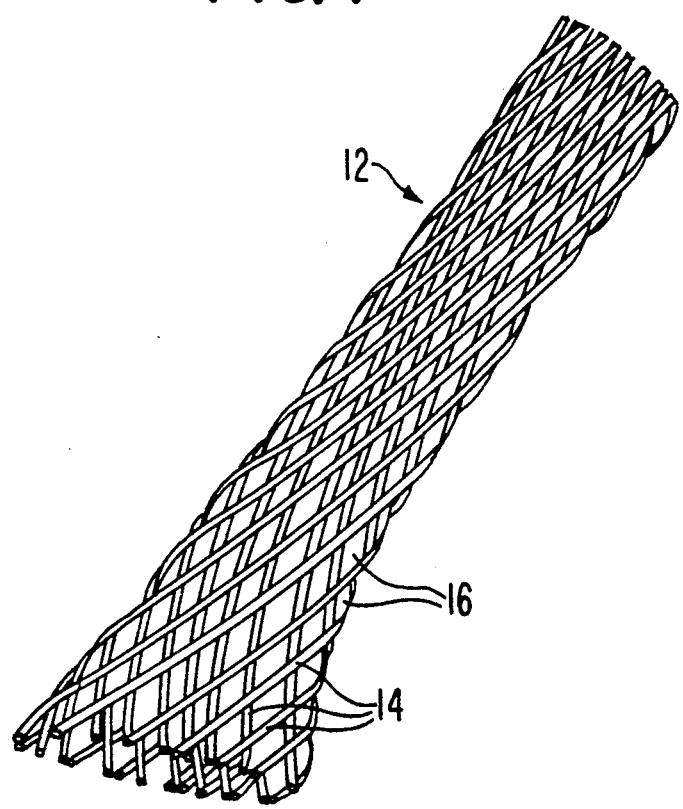
FIG. 7 is a perspective view of the section of FIG. 4, with a portion slightly stretched.

As can be seen from FIGS. 1 and 2, the animal collar according to the present invention, which is designated generally by the reference numeral 10, comprises an elongate tube 12 of open mesh material defined by a net of criss-crossing elements or filaments 14 which define a pattern of openings 16. The filaments 14 are connected to filaments which they cross at their points of intersection. The material of the filaments can be any material which provides the collar 10 with sufficient strength to control the animal. For example, polypropylene is suitable for the tubular member 12, and a net-like tubing of polypropylene in which the criss-crossing filaments are formed integrally connected to one another is commercially available. A net-like tubing of, for example, metal filaments or nylon filaments can also be used.

The filaments 14 extend helically at oblique angles relative to the longitudinal axis of the tubular embodiment 12, and cross one another at angles to form openings 16 in the shape of parallelograms, or diamonds. Rings 18 of steel or other strong material are secured at the ends of the tubular element 12 to define with the tubular element an animal collar of the choke type. In the illustrated embodiment, the rings 18 are attached by extending an end 20, 21 of the tubular element 12 through a ring 18, folding the end 20, 21 back on the adjacent portion of the tubular element and securing it there by, for example, sewing. The stitching is indicated by the reference numeral 22. As another example, heat bonding can be used to secure the ends 20, 21 to the adjacent portions of the tubular member 12, especially in the case of plastic filaments.

A flea strip 24 is held inside the tubular element 12. The flea strip 2 is permeated with chemicals producing vapors to ward off fleas and other insects. The vapors issuing from the flea strip 24 pass through the openings 16 in the tubular element 12. Substances effective in warding off fleas and other pests are well known, and strips already permeated with the substances are commercially available. Such strips are well suited for containment in the tubular member 12. Most commercially-available flea strips 24 have buckles for attaching the strips to an animal, but such buckles can be snipped off easily and the strip inserted into the tubular member 12. It is contemplated that flea strips be made and sold without buckles for the purpose of insertion into the collar 10 of the present invention. Strips containing substances to ward off other pests can also be inserted into the tubular member 12. When the pesticide in the flea strip 24 is exhausted, the flea strip 24 is removed from the tubular member 12 and replaced with a new flea strip.

In an alternate embodiment according to the present invention, as can be seen from FIG. 3, the animal collar, which is designated generally by the reference numeral 30, comprises a tubular element 32 of the same construction and material as the tubular element 12 of FIGS. 1 and 2 having a piece 34 of a strong material, such as leather, attached to one end by, for example, sewing. A belt buckle 36 and a tongue 38, as well as a metal ring 40 for attachment of a leash, are attached to the piece 34. At the opposite end of the tubular member 32, a strip 42 of material having a series of openings 44 is attached in a similar manner. Accordingly, an animal collar 30 of the belt type is formed. The flea strip 24 is held in the tubular member 32.

As can be seen from FIGS. 4 and 5, the size and shape of the tubular member 12 changes from a condition, as shown in FIG. 4, in which no tension is applied to the tubular member and the openings 16 are relatively large, to a condition shown in FIG. 5, in which the tubular member 12 is under tension, is elongated, and is reduced in area in a cross-section transverse to its length. The filaments 14 are sufficiently resilient to cause the tubular element 12 to contract to its unelongated condition when the tension is removed, especially where the filaments 14 are made of plastic. The size of the openings 16 is smaller in the elongated condition than in the relaxed condition. When the filaments 14 resiliently return to their relaxed condition, the openings 16 return to their larger size and allow greater diffusion of insecticidal vapors from the flea strip 24. The total area of the openings 16 is chosen to be sufficient to allow sufficient pesticide vapors from the flea strip 24 to diffuse through the openings 16 to effectively ward off fleas or whatever pests the pesticidal strip is designed to control.

As can be appreciated from FIG. 6, the size of the openings 16 can also be made greater than in their relaxed condition. This is required to allow insertion or removal of a flea strip 24. The size and shape of the openings 16 is chosen so that, when the tubular element 12 is in its relaxed condition, an end of the flea strip 24 will not pass through any of the openings 16, but, upon expansion of one of the openings 16 from the relaxed condition of the tubular element 12, an end of the flea strip 24 can pass through. Accordingly, under normal conditions, that is, when the tubular element 12 is either in the relaxed condition or is under tension, neither end of the flea strip 24 will pass through one of the openings 16. However, an opening 16 in an appropriate location, preferably near an end of the tubular element 12, can be made large enough so that an end of the flea strip 24 can pass through the enlarged opening, thereby permitting insertion and removal of the flea strip 24. At least one opening 16 can be made large enough for insertion or removal of the flea strip 24 by imposing an axial compressive force F on the tubular element 12 on opposite sides of the opening 16 desired to be enlarged. When an opening has been made large enough for an end of the flea strip 24 to pass, the flea strip is inserted all the way into the tubular element 12 so that the trailing end of the flea strip is also inside the tubular element. The enlarging force can be removed once the leading end of the flea strip 24 passes through the enlarged opening 16. The entering flea strip 24 keeps the opening 16 in an enlarged condition until the trailing end of the flea strip passes through the opening. At that point, the opening 16 returns to its relaxed condition due to the resiliency of the filaments 14. Even though an end of a commercially available flea strip 24 might be tapered (to facilitate insertion through a buckle), the transverse cross-section of the flea strip 24 adjacent to the point of taper is larger than any of the openings 16 in their relaxed condition. Therefore, the flea strip 24 is retained in the tubular member 12 even though an end of the flea strip 24 might be tapered smaller than the openings 16 in their relaxed condition. It is preferable that the flea strip 24 extend substantially the entire length of the tubular member 12 in order to provide the greatest surface area of pesticide-diffusing material. Therefore, it is preferable to insert the flea strip 24 through one of the openings 16 near one of the ends of the tubular element 12.

As can be appreciated from FIGS. 4 and 5, the openings 16 are larger when the tubular element 12 is in its relaxed condition than they are when the tubular element is under tension. The openings 16 become even larger than in the relaxed condition by applying the compressive force just described. Of course, there are other ways to enlarge one of the openings 16 sufficiently to allow the insertion or removal of the flea strip 24. When the enlarging force is removed, the enlarged opening 16 returns to the size of its relaxed condition, especially when the collar 10 is placed around the neck of an animal. If the tubular element 12 is made of plastic, the opening 16 returns to its relaxed condition in an even more positive manner, by virtue of the elastic resiliency of the material. In the case of metals and other materials, including some plastics, such as polypropylene, the filaments 14 do not stretch under the tension normally involved in controlling an animal, but the pattern of the helical filaments 14 criss-crossing at oblique angles with respect to the longitudinal axis of the tubular member 12 permits the tubular member as a whole to elongate under tension. In such elongation, the angles of criss-cross of the filaments 14 at their points of intersection change, but the filaments return to their original angles in the relaxed condition upon the removal of the tensioning force due to the resiliency of the material of which the filaments 14 are made, especially where the filaments are made of plastic, thereby defining an elastic memory for the tubular member 12.

The openings 16 are illustrated as being uniform in size, shape and distribution, but the openings can also be non-uniform, as long as the openings define a sufficient area to allow the pesticidal vapors to diffuse adequately and there is at least one opening near an end of the tubular element 12 which can be made large enough to allow the flea strip 24 to be inserted and removed. Although the properties of the tubular element 12 have been specifically described in greater detail, the tubular element 32 of FIG. 3 is of the same material and construction and, therefore, has the same characteristics as the tubular element 12 of FIGS. 1 and 2.

As can be seen from FIG. 7, in an embodiment in which the filaments 14 are made of a plastic, the filaments have a significant thickness and are formed integrally connected to crossing filaments at their points of intersection. For clarity of illustration, the openings 16 adjacent to one end of the section of the tubular element 12 are enlarged relative to the openings adjacent to the opposite end.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

I claim:

1. An animal collar comprising:
   an elongate hollow member having a plurality of openings, at least one of said openings having a first size and shape in a relaxed condition and being deformable from said first size and shape upon the application of a force and returnable to said first size and shape;
   a pesticide member positioned within said hollow member, said pesticide member carrying a pesticide to ward off pests and having ends, each of said ends having a size and shape unable to pass through said at least one opening when said opening has said first size and shape and able to pass through said opening when said opening is deformed form said first size and shape.

2. The animal collar of claim 1, wherein said elongate hollow member comprises an open mesh material, and said openings are defined by said open mesh material.

3. The animal collar of claim 2, wherein said open mesh material comprises a plastic.

4. The animal collar of claim 3, wherein said plastic is polypropylene.

5. The animal collar of claim 2, wherein said open mesh material comprises filaments of material intersecting with one another, said filaments being connected to one another at points of intersection.

6. The animal collar of claim 5, wherein said filaments of material are oriented at oblique angles with respect to the longitudinal axis of said elongate hollow member, whereby said openings have a parallelogram shape.

7. The animal collar of claim 5, wherein said at least one opening is deformable from its relaxed condition by the application of a compressive force parallel to the longitudinal axis of the elongate hollow member.

8. The animal collar of claim 5, wherein said material is a plastic, and said elongate hollow member has an elastic memory.

9. The animal collar of claim 2, wherein said openings are uniform.

10. The animal collar of claim 1, further comprising means for securing said elongate hollow member around the neck of an animal.

11. The animal collar of claim 10, wherein said elongate hollow member has opposite ends, and said securing means comprises a ring attached to each of said opposite ends.

12. The animal collar of claim 10, wherein said elongate hollow member has opposite ends, and said securing means comprises a buckle attached to one of said opposite ends and an apertured member attached to the other of said opposite ends.

13. An animal collar comprising:
    an elongate hollow member for receiving a pesticide member having ends and a pesticide, said elongate hollow member comprising an open mesh material defining a plurality of openings, at least one of said openings having a first size and shape in a relaxed condition preventing an end of a pesticide member from passing through and being deformable from said first size and shape upon the application of a force to a size and shape allowing an end of a pesticide member to pass through and returnable to said first size and shape; and
    means for securing said elongate hollow member around the neck of an animal.

14. The animal collar of claim 13, wherein said open mesh material comprises filaments oriented at oblique angles with respect to the longitudinal axis of said elongate hollow member, whereby said openings have a parallelogram shape.

15. An animal collar comprising:
    an elongate hollow member for receiving a pesticide member having ends and a pesticide, said elongate hollow member comprising an open mesh material defining a plurality of openings, at least one of said openings having a first size and shape in a relaxed condition and being deformable from said first size and shape upon the application of a force and returnable to said first size and shape; and
    means for securing said elongate collar member around the neck of an animal.
    wherein said open mesh material comprises filaments of plastic intersecting with on another, said filaments being connected to one another at points of intersection.

* * * * *